United States Patent [19]

McFarlane

[11] Patent Number: 4,532,842
[45] Date of Patent: Aug. 6, 1985

[54] TILTABLE EDGER SAW MECHANISM

[76] Inventor: Arthur M. G. McFarlane, 1873 Redman Rd., Hamlin, N.Y. 14464

[21] Appl. No.: 428,285

[22] Filed: Sep. 29, 1982

[51] Int. Cl.³ .............................................. B27B 7/02
[52] U.S. Cl. .................................... 83/404.1; 83/433; 83/435.1; 83/520
[58] Field of Search ................... 83/404.1, 435.1, 520, 83/433

[56] References Cited

U.S. PATENT DOCUMENTS 626,846 6/1899 Stewart ............................... 83/404.1
3,771,397 11/1973 Smith .................................. 83/404.1

Primary Examiner—Donald R. Schran
Attorney, Agent, or Firm—Cumpston & Shaw

[57] ABSTRACT

An edger saw mechanism is disclosed which is tiltable for varying the angle of the line along which edger saws cut a board as the board is sawed from a log by a head saw. The mounting for the edger saw is slidably and pivotally mounted on a tiltable post. By varying the position of the post, the edger saws can saw the boards along different angled lines relative to a horizontal line whereby it is possible to obtain increased board area from the log.

19 Claims, 5 Drawing Figures

TILTABLE EDGER SAW MECHANISM

BACKGROUND OF THE INVENTION

1. Field of the Invention

The present invention relates generally to the sawing of boards from logs, and more specifically to an improved edger saw mechanism for sawing at least one edge from a board.

2. Description of the Prior Art

Edger saw mechanisms for sawing one or more edges from a board as it is being sawed from a log to form a finished board are well known in the art. Such edger saw mechanisms have circular edger saws spaced a set distance apart for sawing the edges of a board to obtain one or more finished boards of a finite width. The edger saws are mounted to lie in vertically spaced horizontal planes for sawing the board edges along horizontal kerf lines as a log is transported on a horizontal flat bed of a carriage past the edger saws.

As is well known, logs cut from certain trees are not always straight or generally cylindrical. In many instances, such logs vary greatly in diameter from one end to the other and are not symmetrical about the log axis, which in turn may not be straight. The non-symmetry is due, for example, to irregular knots and other projections on the periphery of the log.

When an irregularly shaped or non-symmetrical log is transported past a head saw for the first time in a board sawing operation, a bark segment of the log is sawed off exposing a face side of the log. When the carriage is returned, the edger saws are positioned to saw off the bark edges or wane when the log is again transported past the head saw to saw a finished board from the log of a finite width. A problem in sawing boards from certain irregularly shaped logs with the prior known edger saw mechanisms is that it is impossible to saw a finished board from the log of the largest width possible. This is so because the edger saws can only saw the board edges along horizontal lines whereas the bark edge or wane may be angled to the horizontal. What occurs, is that the board sawed from the log is smaller than could possibly be achieved, resulting in a reduced board quality and/or board area obtained from a log.

SUMMARY OF THE INVENTION

A primary object of the present invention is to provide an improved edger saw mechanism for sawing finished boards from a log of the largest possible width.

In accordance with this invention, an improved edger saw mechanism is provided comprising an edger saw mounted for tiltable, rotational and axial movement. Means are provided for tilting the edger saw between a first position in which the edger saw is positioned to saw a board along one line, and a second position in which the edger saw is positioned to saw a board along a different line at an angle to the first line. By virtue of this ability to adjust the saw angle of the edger saw, it is possible to saw finished boards of maximum width. This is noticeable in FIG. 1 which shows that by angling the edger saws it is possible to saw a board from the log of a width A with little wastage. With the conventional edger saw mechanism in which the edger saws are horizontally oriented, the largest width of board obtainable is of a width B, which is considerably smaller than width A.

The invention and its advantages will become more apparent from the detailed description of the invention presented below.

BRIEF DESCRIPTION OF THE DRAWINGS

The details of this invention will be described in connection with the accompanying drawings, in which.

DETAILED DESCRIPTION OF THE INVENTION

Figure 1:
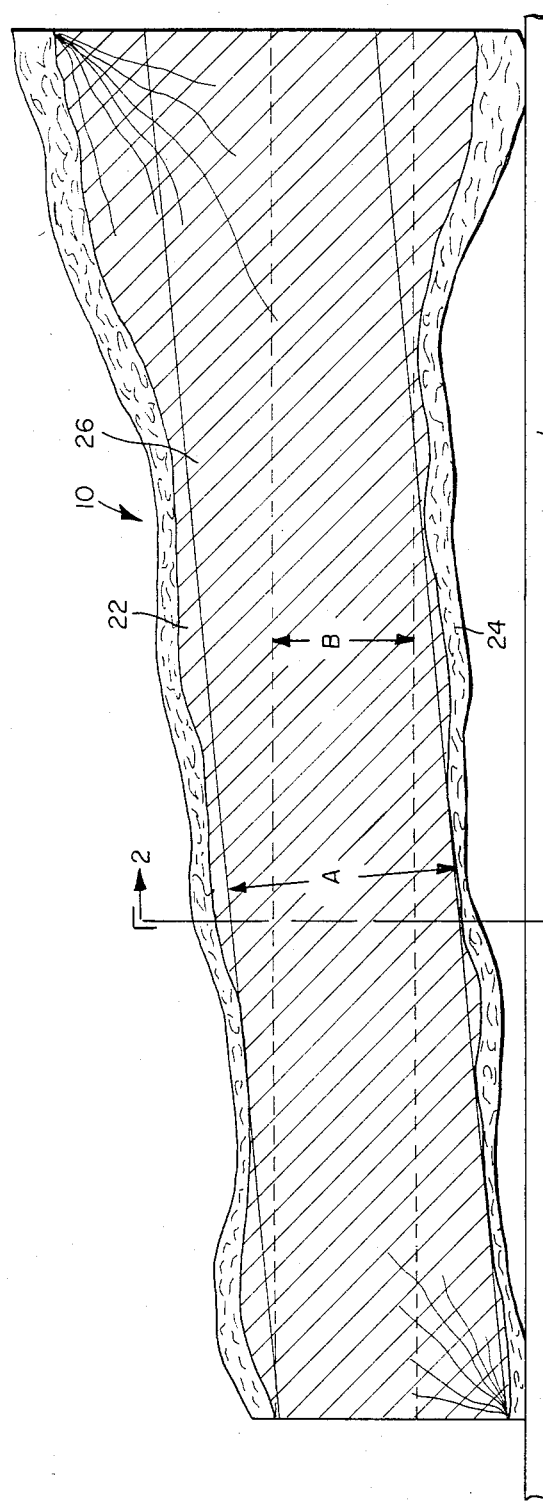
FIG. 1 is a side elevational view of a log in which a bark segment has been removed, and further shows by dotted lines the edger saw kerf lines achieved by a conventional edger saw mechanism, and by full lines the angled kerf lines achieved by a preferred embodiment of an edger saw mechanism of this invention.
Figure 2:
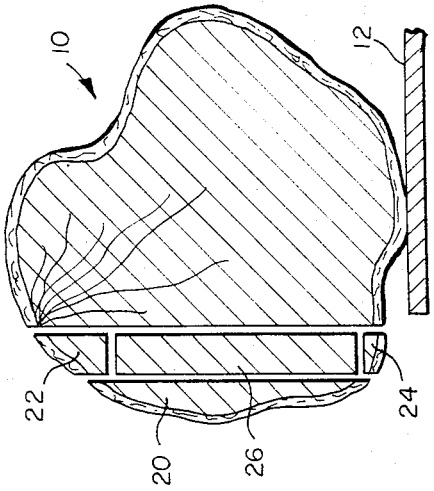
FIG. 2 is a section view taken substantially along line 2—2 of FIG. 1, and additionally including the bark segment.

With reference to FIGS. 1 and 2, an irregularly shaped log 10 is shown mounted on a bed 12 of a carriage 14 which is reciprocally movable on track rails 16. As is well known in the saw mill industry, a log 10 to be sawed into boards is reciprocally moved via carriage 14 back and forth past a circular head saw 18. Mechanism, not shown, is provided for properly positioning and holding log 10 on carriage 14 such that on its first pass past head saw 18, a bark segment 20 is sawed from the log. Log 10 is moved laterally by the mechanism a finite distance, such as an inch, for example, and transported past head saw 18 once again for sawing off a one inch thick face board. During this second pass, park edge portions or wane 22, 24 are simultaneously sawed from the board to form a finished board 26 of a width A determined by the distance between edger saws 28.

Figure 3:
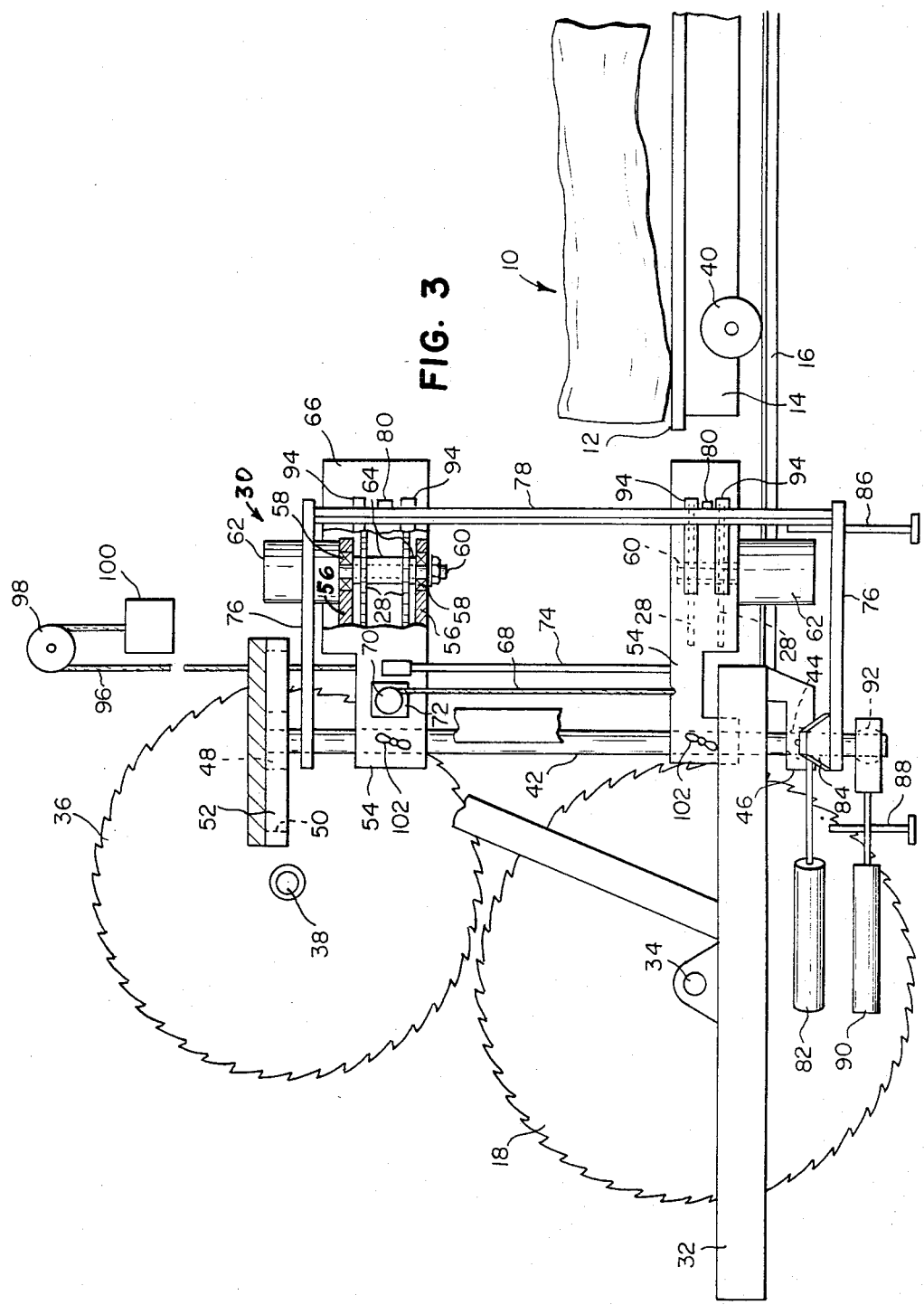
FIG. 3 is a side elevational view of a preferred embodiment of an edger saw mechanism of this invention with portions thereof sectioned for purposes of clarity.
Figure 4:
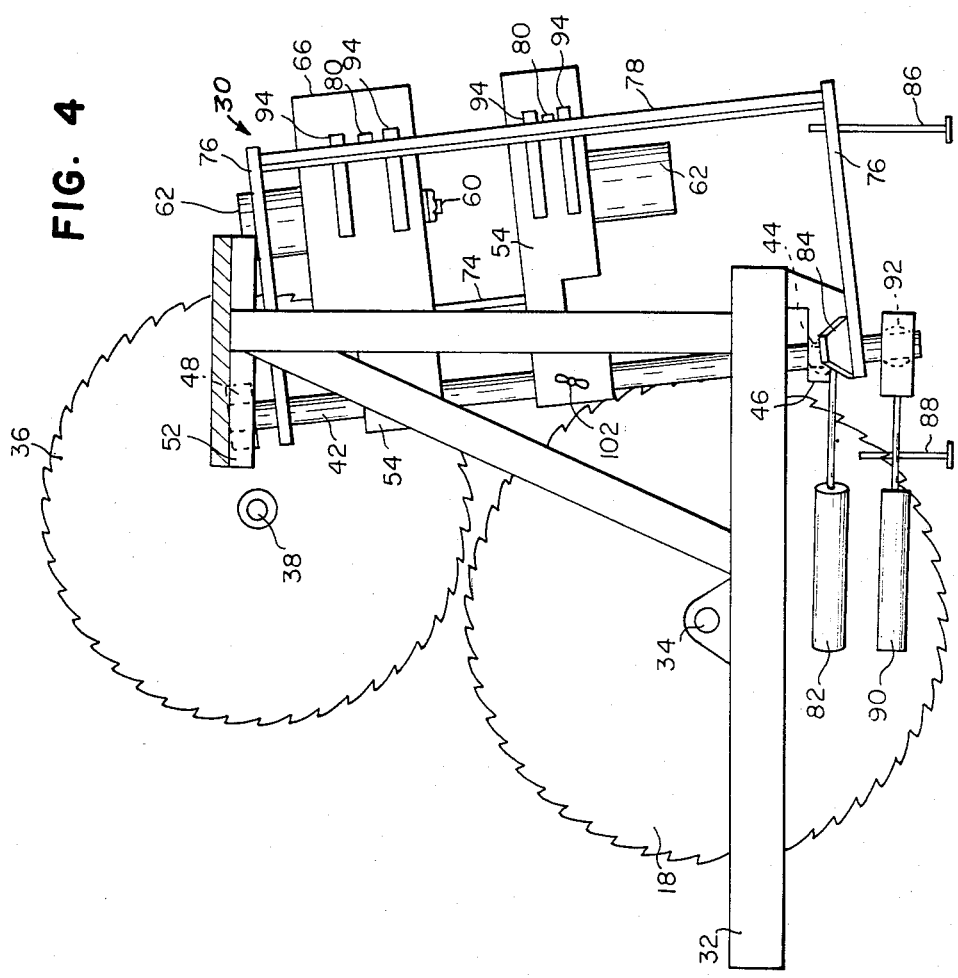
FIG. 4 is a view similar to FIG. 3 showing the edger saw mechanism tilted for sawing edge kerfs at an angle to the horizontal as seen in FIG. 1.
Figure 5:
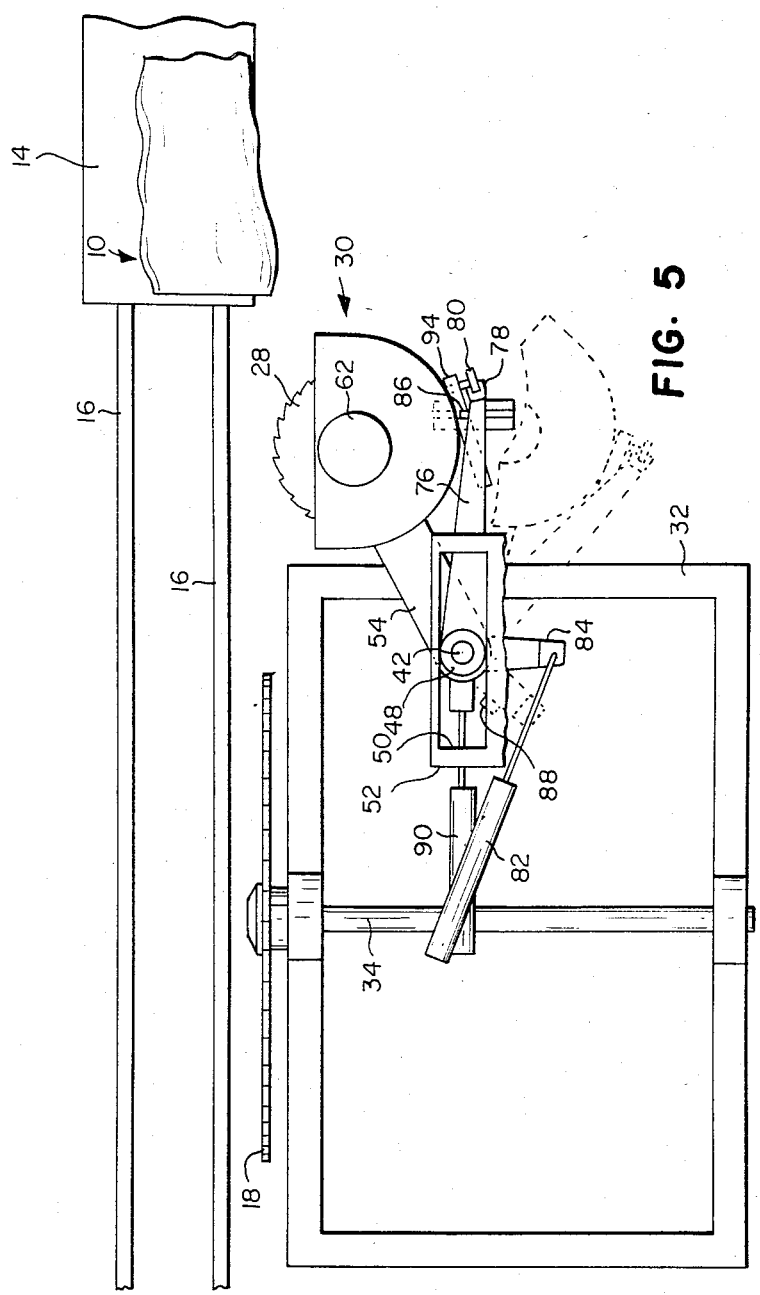
FIG. 5 is a top plan view of the edger saw mechanism of FIG. 3 showing, in full lines, the mechanism in a position for edge sawing a board, and in dotted lines, the mechanism in a position retracted from the log.

With reference to FIGS. 3–5, a saw mill is disclosed in which a preferred embodiment of an edger saw mechanism 30 of this invention is incorporated. The edger saw mechanism 30 is tiltable so as to saw a board 26 at an angle relative to the horizontal, as seen in FIG. 1. The advantage of this is to enable the sawyer to improve the quantity and/or quality of the boards obtained from a log. As observable in FIG. 1, by angular edge sawing, a finished board 26 of a width A is obtainable which is wider than a finished board B normally obtained by horizontal edge sawing.

The saw mill comprises a rigid frame or husk 32 for rotatably supporting a shaft 34 having a vertically oriented circular head saw 18 secured to one end thereof. To saw logs 10 of large diameter, an additional circular top saw 36 lying in the plane of head saw 18 is rotatably mounted on a shaft 38 spaced from and parallel to shaft 34. The head and top saws 18, 36 respectively are rotatably driven by any suitable drive motors, not shown.

While a conventional circle head rig including a rotating head saw and top saw are shown and described, other arrangements such as a band head rig may be used with the edger of this invention.

Carriage 14 for supporting a log 10 is mounted on wheels 40 which ride on rails 16. Any suitable drive means, not shown, is provided for reciprocally driving carriage 14 past head and top saws 18, 36 for sawing boards from the log secured to the carriage. The mechanism for supporting log 10 on carriage 14, and laterally moving the log to vary the thickness of a board sawed therefrom are well known in the art, and hence not shown or described.

The edger saw mechanism 30 of this invention comprises a main vertically extending support post 42 having a spherical bearing 44 or the like adjacent its lower end mounted for tiltable and rotational movement within a fixed bearing housing 46. Housing 46 is secured to husk 32 prior to head saw 18 in the direction of transport of a log 10 past the head saw for sawing a board from the log. A roller 48 is mounted on the upper end of post 42 and extends into a groove 50 in a slide member 52 rigidly secured to husk 32 to allow tiltable movement of post 42 and roller 48 in a plane parallel to the plane of head saw 18.

Means for mounting one or more circular edger saws 28 for sawing the edge bark portions 20, 22 off each board to obtain a finished board 26, and/or to saw a plurality of boards of a finite width during a single cut comprises one or more housing 54. Each housing 54 has an opening at one end within which post 42 is slidably and rotatably journaled. The opposite end of each housing 54 has a pair of spaced, parallel plates 56 having bearings 58 for rotatably supporting an edger saw shaft 60 extending therethrough. A drive motor such as a hydraulic motor 62 is mounted on one plate 56 and coupled to one end of shaft 60. One or more edger saws 28 are mountable on the shaft, and spacers 64 provided between the saws to vary the axial distance between the saws and the finite widths of boards cut by the saws. A semi-cylindrical protective shield 66 partially encircles edger saws 28 and is secured to each housing 54 by any suitable means.

Means are probided for varying the distance between the upper saw 28 of the lower housing 54 and the lower saw 28 of the upper housing 54. The means comprises a cable 68 having one end secured to lower housing 54, and the opposite end windable on a pulley 70 driven by a hydraulic motor 72 or the like mounted on upper housing 54. A tape measure 74 extending between the upper and lower housings 54 indicates to the sawyer the distance between the upper and lower saws 28, and hence the width of a finished board 26 sawed from a log 10.

The edger saw mechanism 30 further has means for pivoting the edger saw housings 54 in unison between an edge sawing position and a retracted position. The pivoting means comprises a guide frame having upper and lower guide bars 76, each having one end secured to post 42. A guide channel 78 parallel to post 42 has each end thereof secured to the opposite end of one of the guide bars 76. A roller 80 secured to each of the housings 54 is rotatably positioned in guide channel 78 for securing the housings to the guide bars. Accordingly, rotatable movement imparted to post 42 in one direction or the other imparts pivotal movement to edger housings 54 and saws 28 between edge sawing and retracted positions. Rotatable movement is imparted to post 42 by a fluid cylinder 82 coupled to the free end of a bent arm 84 secured to post 42. Stop members 86, 88 are provided to precisely locate the edger saws in their edge sawing and retracted positions, respectively. Stop member 88 is optional and may be omitted if desired. In the edge sawing position, the periphery of edger saws 28 at one point lies in the plane of head saw 18 so that the edger saws do not penetrate into the face side of a log 10 during a board sawing operation (see FIG. 2).

Any suitable mechanism may be provided for tilting post 42, edger saw housings 54 and edger saws 28 to a desired angle relative to the horizontal to obtain the maximum possible finished board area during a board sawing operation. The tilting mechanism may comprise, for example, a fluid cylinder 90 coupled by a spherical bearing 92 or the like to post 42, and any suitable mechanism, not shown, for operating the cylinder. To set the edger saws 28 to the proper angle, conventional laser units 94 are provided on the protective shields 66 to indicate by a lighted dot or line projected onto the log face the path the edger saws 28 will take. During an angled cut, which may be along a straight line as seen in FIG. 1, or along a curved line if the edger saws 28 are tilted during a sawing operation, the force exerted on the edger saws as they follow the kerf or groove cause the housings 54 and edger saws 28 to move upwardly along post 42 and guide channel 78. To minimize the weight of the housings so that upward movement thereof can be achieved with little effort, a cable 96 has one end connected to the upper housing 54, its intermediate portion trained around a pulley 98 secured to a rigid support above the mechanism, and a counter weight 100 secured to its other end.

For board sawing operations in which the edger saws are adjusted to saw boards along horizontal kerf lines, a manually operable clamp 102 is provided on each housing 54 engageable with the vertically oriented post 42 to prevent the edger saws 28 from drifting.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

I claim:

1. In a saw mill including means for moving a log along a first line past a series of saws for cutting said log into boards; an edger saw mechanism comprising:
   a shaft;
   an edger saw mounted on said shaft for rotation about an axis;
   means for mounting said edger saw for tiltable and rotational movement;
   means supporting said mounting means for axial movement while sawing; and
   means for tilting said mounting means in a plane substantially parallel to said first line between a first position in which said edger saw is positioned to saw a board along one line, and a second position in which said edger saw is positioned to saw a board along a different line at an angle to said first line whereby the board area obtained from the log is increased.

2. An edger saw according to claim 1 comprising a tiltable post, edger saw mounting means through which said post extends, and a counterweight connected to said edger saw mounting means.

3. An edger saw according to claim 2, further comprising a guide frame mounted on said post, and a projection on said mounting means slidably extending into a channel on said guide frame.

4. An edger saw according to claim 3 wherein said projection comprises a roller.

5. An edger saw according to claim 2 wherein said edger saw mechanism comprises a guide member, and said post has one end slidably mounted in said guide member, said edger saw mechanism further has pivot means for said post intermediate its ends, and said tilting means comprises a fluid cylinder connected to the opposite end of said post.

6. An edger saw according to claim 3, further comprising means for pivoting said guide frame and said post for retracting said edger saw from the path of a log.

7. An edger saw according to claim 6 wherein said pivoting means comprises an arm having one end secured to said post, and a fluid cylinder connected to the opposite end of said arm.

8. An edger saw according to claims 1 or 2, further comprising a protective shield on said edger saw and a laser unit on said shield for directing a light dot or line on the log indicating the path the edger saw will follow.

9. In a saw mill including means for moving a log along a first line past a series of saws for cutting said log into boards; an edger saw mechanism for edge cutting a board as it is sawed from said log by a head saw comprising:
at least one edger saw;
mounting means for tiltably and rotatably supporting said edger saw on an axis with said edger saw normally lying in a first horizontal plane for edge cutting a board on a first horizontal line as the board is transported past said edger saw in a second plane at right angles to said first plane;
means for supporting said mounting means for axial movement while sawing; and
means for tilting the axis of said edger saw in a third plane substantially parallel to said second plane at an angle to said first plane so that said edger saw edge cuts a board on a second line at an angle to said first line whereby the board area obtained is increased.

10. An edger saw mechanism according to claim 9 wherein said means for slidably supporting said mounting means comprises a tiltable post, an opening in said edger saw mounting means through which said post extends, and a counterweight connected to said edger saw mounting means.

11. An edger saw mechanism according to claim 10, further comprising a guide frame mounted on said post, and a projection on said mounting means slidably extending into a channel on said guide frame.

12. An edger saw mechanism according to claim 10 wherein said edger saw mechanism comprises a guide member, and said post has one end slidably mounted in said guide member, said edger saw mechanism further has pivot means for said post intermediate its ends, and said tilting means comprises a fluid cylinder connected to the opposite end of said post.

13. An edger saw mechanism according to claim 11, further comprising means for pivoting said guide frame and said post for retracting said edger saw from the path of said log.

14. An edger saw mechanism according to claim 13 wherein said pivoting means comprises an arm having one end secured to said post, and a fluid cylinder connected to the opposite end of said arm.

15. An edger saw mechanism according to claims 1 or 2 comprising at least two edger saws mounted at a preselected spacing for making parallel cuts at a preselected angle through said log.

16. An edger saw rotatable about an axis operative to saw along a line and mounted for movement parallel to the axis of rotation of said saw; and means for tilting said axis in a plane substantially parallel to the line of sawing.

17. The edger saw of claim 16 further comprising means for balancing the weight of said saw.

18. The edger saw of claim 17 wherein said balancing means comprises a counterweight.

19. The edger saw of claim 17 wherein said balancing means comprises a spring.

* * * * *